United States Patent
Mönig et al.

(10) Patent No.: US 9,919,678 B2
(45) Date of Patent: Mar. 20, 2018

(54) ASSEMBLY MODULE FOR A MOTOR VEHICLE WITH AN OPTICAL SENSOR SYSTEM FOR MONITORING A DETECTION REGION AND AN ACTUATION REGION

(71) Applicant: Huf Hülsbeck & Fürst GmbH & Co. KG, Velbert (DE)

(72) Inventors: Stefan Mönig, Schwelm (DE); Helmut Schumacher, Coesfeld (DE); Norbert Heller, Grefrath (DE); Oliver Müller, Velbert (DE); Bernd Ette, Wolfsburg (DE); Nadine Sticherling, Essen (DE); Alexander Ziegler, Wülfrath (DE); Jean Malabo Yomkil, Essen (DE); Mirko Schindler, Velbert (DE); Iko Lindic, Essen (DE); Christof Hache, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 15/115,489

(22) PCT Filed: Jan. 7, 2015

(86) PCT No.: PCT/DE2015/100005
§ 371 (c)(1),
(2) Date: Jul. 29, 2016

(87) PCT Pub. No.: WO2015/113551
PCT Pub. Date: Aug. 6, 2015

(65) Prior Publication Data
US 2017/0182975 A1  Jun. 29, 2017

(30) Foreign Application Priority Data

Jan. 31, 2014  (DE) .................. 10 2014 101 204

(51) Int. Cl.
*G08B 21/00* (2006.01)
*B60R 25/24* (2013.01)

(52) U.S. Cl.
CPC .................................. *B60R 25/24* (2013.01)

(58) Field of Classification Search
CPC ................ B60R 25/24; G07C 9/00309; G07C 9/00182; G07C 2009/00984
(Continued)

(56) References Cited

U.S. PATENT DOCUMENTS

2005/0046584 A1* 3/2005 Breed .................... B60C 11/24
340/13.31
2008/0296926 A1* 12/2008 Hanzel ................ B60R 25/2054
296/146.1
(Continued)

FOREIGN PATENT DOCUMENTS

DE  102005032402 B3  9/2006
DE  102007050094 A1  4/2009
(Continued)

*Primary Examiner* — Mark Rushing
(74) *Attorney, Agent, or Firm* — Rudy J. Ng; Bret E. Field; Bozicevic, Field & Francis LLP (57) ABSTRACT

The invention relates to an assembly module (20) for a motor vehicle (1), comprising an optical sensor system (30) which is suitable for: a) monitoring a detection region (150) lying outside of the motor vehicle (1) in order to determine the proximity of a user (10), b) in the event of a detection of the user (10) in the detection region (150), monitoring an activation region (160) arranged within the detection region (150) in order to determine whether the user (10) is located within the activation region (160), and c) in the event of a detection of the user (10) in the activation region (160), triggering a signal for the execution of an action at the motor vehicle (1).

22 Claims, 7 Drawing Sheets

(58) Field of Classification Search
USPC ........................................................ 340/5.64
See application file for complete search history.

(56) References Cited

U.S. PATENT DOCUMENTS

| | | | | |
|---|---|---|---|---|
| 2010/0214112 A1* | 8/2010 | Ishihara | ................ | B60R 25/246 |
| | | | | 340/686.1 |
| 2013/0200995 A1* | 8/2013 | Muramatsu | ............. | E05F 15/73 |
| | | | | 340/5.51 |
| 2014/0104240 A1* | 4/2014 | Eriksson | ................ | G06F 1/169 |
| | | | | 345/175 |

FOREIGN PATENT DOCUMENTS

| | | |
|---|---|---|
| DE | 102009023594 | 12/2010 |
| DE | 102010056171 A1 | 6/2012 |
| DE | 102011115760 A1 | 4/2013 |
| WO | WO2013031806 A1 | 3/2013 |

* cited by examiner

ASSEMBLY MODULE FOR A MOTOR VEHICLE WITH AN OPTICAL SENSOR SYSTEM FOR MONITORING A DETECTION REGION AND AN ACTUATION REGION

The present invention relates to an assembly module for a motor vehicle, as well as to a method for triggering a signal for executing an action on a motor vehicle.

As known in the art for motor vehicles, the environment can be monitored in order to execute actions on a motor vehicle. For example, so-called "keyless entry" and "keyless go" functions are used in motor vehicles. For example, radio monitoring is here used to detect when a corresponding radio key, e.g., in the pants pocket of a user, is located in proximity to the vehicle. An authentication can subsequently be performed as the action, during which a query can determine whether the key matches the vehicle.

The vehicle can then be opened or locked. Also known are other monitoring methods, e.g., capacitive. For example, capacitive sensors can be used to detect the hand of a user gripping a door handle. This can also trigger an action, e.g., to authenticate a user based on the radio key worn on their body.

The disadvantage to known solutions is that they always require an active triggering or an active start. For example, the capacitive sensor only triggers the authentication when the user actually reaches for the vehicle handle. The same holds true for automatically opening the tailgate, which only opens when the user is correspondingly in close enough proximity to the vehicle and comprises a corresponding sensor system. In addition, known methods are not sensitive enough, resulting in the basic risk that a gesture or a user might be misinterpreted.

The object of the present invention is to at least partially eliminate the disadvantages described above. In particular, the object of the present invention is to cost-effectively and easily reduce or even entirely avoid the risk of a signal being erroneously triggered for executing an action on the vehicle.

The above object is achieved by an assembly module with the features in claim 1, as well as by a method with the features in claim 20. Additional features and details of the invention may be gleaned from the subclaims, which are described in conjunction with the assembly module according to the invention, and of course also in conjunction with the method according to the invention and respectively vice versa, so that reciprocal reference can and is always made to the individual aspects of the invention in terms of the disclosure.

An assembly module according to the invention for a motor vehicle comprises an optical sensor system, which is suitable for a) monitoring a detection region lying outside of the vehicle, so as to determine the proximity of a user, b) in the event the user is detected in a detection region, for monitoring an actuation region arranged within the detection region to determine whether the user is located within an actuation region, and c) in the event the user is detected in an actuation region, triggering a signal for executing an action on the motor vehicle.

Based on the invention, then, it is now possible to execute a two-stage method with an assembly module according to the invention. As a result, various functionalities can be implemented in the corresponding units of a control device of the optical sensor system. In order to execute the first step, specifically essentially continuously monitoring the detection region lying outside of the motor vehicle, it is here advantageous, for example, to use transmitting and monitoring units that are especially small and low-energy, but suitable for continuous operation. For example, simple photo sensors can here be used, which are inexpensive, small and above all can be operated at a low energy demand.

Only given a case where a user within this permanently monitored detection region is detected will an evaluation be performed with regard to the actual positioning of the user relative to an actuation region as the second stage in a corresponding process. To this end, the optical sensor system in a corresponding control device can comprise a second monitoring unit, e.g., for transmitting and receiving laser light flashes and reflecting the latter.

Because an assembly module according to the invention is designed for multiple stages, in particular for two stages, this second procedural step can now take place selectively. In other words, this second execution step need now not be carried out permanently, making it possible to design the corresponding unit within the optical sensor system for a higher energy demand. This stems from the fact that this high energy demand is only used when it is also needed with a high probability, and can lead to the detection of a user within an actuation region.

Therefore, the core of the present invention enables a two-stage detection method with an assembly module according to the invention. As a result, the desired signal can be triggered with a reduced probability of error for executing an action on the motor vehicle on the one hand. On the other hand, however, the necessary level of detail for determining the relative position of the user correlated with the actuation region becomes necessary when the user is located in the larger detection region.

In particular, the assembly module according to the invention or the corresponding method also involves executing the authentication test yet to be described later. In other words, before step b) is executed, an additional verification step is performed to ascertain whether the high energy demand for determining the user relative to the actuation region is here actually also worthwhile. In summary, an assembly module according to the invention can more accurately provide the function with individual procedural steps. A simple, inexpensive sensor module suitable for continuous operation or a sensor unit can be used for monitoring the detection region. In the second step, specifically determining the relative position of the user as correlated with the actuation region, a correspondingly more expensive sensor that above all can also be operated at a higher energy demand can be used for the optical sensor system. According to the invention, the assembly module can be secured to the motor vehicle. An optical sensor system is to be understood as a system that comprises one or more sensor units. The latter can be used to optically monitor the detection region. For example, the sensor system can comprise a photo sensor, which has individual photosensitive pixels. As a result, an image, in particular a two-dimensional image, of the detection region can be provided, and changes in the individual pixels can be taken as the basis for monitoring a user entering into the detection region. In other words, the detection region can now be monitored in purely an optically manner, and above all continuously.

In the sense of the present invention, a detection region is a region next to our outside of the vehicle, in which it is assumed with a high probability that the user will perform a requested, subsequent action. For example, such a detection region can be situated behind the vehicle, and prompt an assumption that there will be an action relating to the tailgate, e.g., a request to open the tailgate. It is further possible for a corresponding detection region to be created next to the vehicle, e.g., in the region of the driver door or rear door, in particular in the region of a sliding door. In this type of case, a user entering into this detection region would lead to the highly probable assumption that there is a request to activate the corresponding door.

According to the invention, a distinction can be made between the detection region and actuation region. The actuation region is here arranged within the detection region, and preferably smaller, in particular distinctly smaller, in design than the detection region. As a result, an essentially two-stage detection can be taken as the basis. According to the invention, the detection region is preferably monitored continuously, and hence constantly. As a result, the entry of a user into the detection region is recognized. At this point in time, and preferably just after this point in time, the smaller actuation region within the detection region is monitored. In other words, the optical sensor system according to the invention has a basic monitoring functionality with regard to the detection region. In this case, or as a function of the entry by a user into the detection region, a laser light flash can be sent out to enable a correlation with the predefined actuation region.

For example, if the assembly module is located in the rear end of the vehicle, it serves to trigger the opening request for automatically opening the tailgate as a corresponding signal. To this end, the detection region lying behind the motor vehicle is continuously monitored. If the user now enters into this detection region, this is recognized, and an authentication step can take place, e.g., beforehand. If the user is confirmed as an authenticated user based on an existing radio key, e.g., in his or her pants pocket, the actuation region can now be monitored, either actively or passively. If the user or a body part of the user is detected within the actuation region, the signal is triggered for executing the action on the motor vehicle, specifically automatically opening the tailgate. In other words, the user first enters into the detection region, and must then move him or herself or a body part into the actuation region, so as to trigger the desired signal for executing the action on the motor vehicle with the help of the laser light flash in a three-dimensional information structure.

It may be provided that the optical sensor system or entire assembly module be designed to be situated on the vehicle rear, e.g., behind the rear window, in a handle strip, in an emblem, in a taillight, behind a reflector, on a bumper and/or in a gap between two components. Alternatively or additionally, the assembly module may be suitably attached to a vehicle side, e.g., to a B-pillar. As a result, the optical sensor system can be used to monitor various detection regions, in which a user approaches the motor vehicle in a conventional manner. In particular, the optical sensor system or the entire assembly module can be concealed behind a layer that is outwardly opaque, but translucent to the light of the optical sensor system. For example, the bumper to which the optical sensor system is mounted can be painted.

The optical sensor system is preferably arranged on the motor vehicle in such a way as to gather little dirt. For example, the optical sensor system can be situated behind the rear window in the wiper region of the windshield wiper or on the handle strip. Alternatively or additionally, the assembly module can comprise a washer nozzle, with which the optical sensor system can be cleaned. For example, the washer nozzle can here always automatically clean the optical sensor system when the windshield wiper of the front and/or rear window is also activated. A clean optical sensor system requires less light intensity to function, so that this also enables an energy savings.

The intensity of the emitted light can depend on the brightness of the ambient light. The brightness of the ambient light can be determined by a brightness sensor.

If various user intentions can be determined while monitoring the actuation region, then different gestures may be assigned to different user intentions. For example, stepping into the actuation region with the foot can make the tailgate open, while moving the hand sideways near the optical sensor will cause the trailer coupling to deploy.

It is conceivable that the object must be removed from the actuation region within a prescribed removal duration so as to provide the signal. Removing an object within a prescribed removal duration can be part of the gesture. The user can perceive when the removal duration begins. For example, a display element can assume several lighting statuses. In one lighting status, such a display element can emit light with a constant brightness. In another lighting status, for example, the brightness can periodically change. For example, the display element can emit light with a constant brightness at the beginning of the actuation duration. During the removal duration, the display element can blink, for example. The signal is provided only when the object, in particular a body part of the user, is removed from the actuation region within the removal duration.

It may be provided that the assembly module and/or motor vehicle comprise at least one means to help the user more easily express his or her intention in the actuation region, so that the signal is triggered.

The assembly module may send out an alert signal that the actuation duration will end shortly. For example, the alert signal can be initiated by changing the lighting status of the display element. The alert signal can correspond to another lighting status of the display element. For example, the display element can blink toward the end of the actuation duration. The means follows a corresponding prescribed procedure in the monitoring unit.

The user may likewise find it helpful in expressing his or her intention if the user is guided to the actuation region. This is the case in particular if the user is carrying a large object, and thus unable to see the end surface of the actuation region on the floor surface. To this end, the assembly module and/or motor vehicle can comprise means that are able to generate a signal perceivable by the user, in particular a visible, audible or tactile signal. For example, the assembly module can comprise luminous elements, e.g., LED's. The luminous elements can be arranged in such a way that the luminous elements act as signposts. For example, the luminous elements can be aligned in such a way as to generate markings on the floor surface that lead to the actuation region. Additionally or alternatively, the luminous elements can be arranged side by side. The luminous elements can be turned on in a sequence that shows the user the direction in which the user has to move toward the actuation region. Instead of the luminous elements, this can also be accomplished with existing light elements arranged side by side in the motor vehicle, e.g., the luminous elements of a headlamp, a brake light, blinker or the like. Also conceivable is to provide the user with an acoustically audible instruction as to the direction in which the user must move. To this end, the assembly module can comprise a loudspeaker. Also conceivable is to impart the change in direction to the ID transmitter, which guides the user through different vibrations. Once the user has been notified about a change in direction, the optical sensor system determines the position of the user and the direction in which he or she must move toward the actuation region, and prompts the perceivable means to send out the corresponding signal.

It can likewise be helpful to the user for the position of the actuation region and/or the length of the actuation duration to be variable. This is helpful in particular if a physically impaired user wishes to express his or her intention. Likewise, this is helpful if the actuation region is situated in a position inconvenient to the user. The inconvenient position may here be a permanent one. For example, the actuation region may end at a trailer coupling. Alternatively, the inconvenient position can only be inconvenient for triggering a one-time operating signal, e.g., because the actuation region ends in a puddle. In particular a predefined user action can be provided in order to change the position of the actuation region and/or length of the actuation duration. For example, the user can change the position of the actuation region and/or length of the actuation duration by making an entry in a user menu, e.g., of a motor vehicle control device or an ID transmitter. Alternatively, the predefined user action can be detected by the optical sensor system. In another alternative, the assembly module can be switched over to a learning mode, in which the assembly module learns the changed position of the actuation region and/or changed length of the actuation region.

It can likewise be helpful to the user for the actuation region to again be monitored to determine a user intention to trigger an operating signal once a first actuation duration has ended without the detection of a user intention. This is helpful in particular if the user was distracted and failed to reach the actuation region in time, or made the wrong gesture. Therefore, it can be provided that it be possible to monitor the actuation region several times, in particular two or three times, in succession. The renewed monitoring of the actuation region can be introduced automatically. Alternatively, a predefined user action can be provided so as to again monitor the actuation region for an additional actuation duration. To this end, for example, the user can address a capacitive sensor. Alternatively, the case can involve a predefined user action that is detected by the optical sensor system.

The predefined user action, which is detected by the optical sensor system and initiates a change in the position of the actuation region and/or actuation duration and/or a renewed monitoring of the actuation region for detecting a user intention, can involve the following user actions: a prescribed gesture within the actuation and/or detection region, for example moving a body part of the user back and forth, not removing the body part when a removal had been envisaged, the user moving into the detection and/or actuation region and/or out of the detection and/or actuation region. In particular, the body part can be a hand or a foot. It can further be provided that the user leave the detection region for a prescribed time, and then return to the detection region again.

If the actuation region is again monitored to determine a user intention, the display element will also indicate this. If the position of the actuation region is changed, the display element will indicate this. To this end, the display element can comprise several lighting means, e.g., LED's. One or more lighting means each make an actuation region at least partially visible. The actuation region with the changed position preferably lies within the detection region. Depending on what actuation region is being monitored, the corresponding pixels are evaluated.

It can happen that a position of the ID transmitter is checked during or after an authentication and before triggering the signal. The strength of a signal sent out by an ID transmitter can be used for this purpose. For example, the receive signal strength indicator (RSSI) can be used to this end. For example, ascertaining the strength of the transmitted signal makes it possible to determine whether the user is located in front of, next to or in back of the motor vehicle. In so doing, it can be ensured that only the authorized user himself or herself has entered into the detection region, and expressed his or her user intention in the actuation region. Also conceivable is to cyclically query the RSSI.

Based on the invention, it may be advantageous in an assembly module according to the invention that the optical sensor system be designed to use less energy for monitoring the detection region than for monitoring the actuation region. To this end, the optical sensor system can comprise a control device, which is provided with a detection unit for monitoring the detection region. A transmitting unit and receiving unit can further be provided for monitoring the actuation region. The core in this embodiment lies in the difference in energy demand when executing the respective procedural step. As already explained, the reduced energy demand for permanent monitoring while monitoring the detection region can now protect the battery of the vehicle. An elevated energy demand can be used for the necessary determination of details or fine positioning of the user relative to the actuation region, since this need only be done in individual situations, specifically as a function of the actual positioning of the user relative to the detection region.

An assembly module according to the invention can be further developed in such a way that, in order to monitor the actuation region within the detection region, the optical sensor system is designed to send out a laser light flash and detect the reflection of the laser light flash from the user.

According to the invention, using a laser light flash for additionally detecting distance information from the user is significant in this embodiment. In the present invention, the laser light flash can now be used to obtain three-dimensional information by detecting its reflection. While the simple optical sensor system is equipped with a photo sensor, for example, the laser light flash can add three-dimensional distance information in addition to the two-dimensional information of such a photo sensor. This makes it possible to define the detection region or in particular the actuation region in terms of its distance from the vehicle or assembly module.

Using a laser light flash makes it possible to obtain the described 3D information. A so-called "time of flight" (TOF) process can here be used. This case involves determining the time that passes from when the laser light flash is transmitted until the laser light flash reflection is received. This time difference can be used to calculate distance or determine distance via correlation with the speed of light. As a result, the detection of the corresponding user within the detection region or within the actuation region can now take place not just on a basic level, but correlated with the distance information.

With respect to the detection region and actuation region, using a laser light flash according to the invention now makes it possible to display these regions not just as a two dimensional surface outside of the vehicle, but instead to also represent the detection region and actuation region as a detection volume or actuation volume. Let it here be noted that an extension from the floor up to a maximum height is of course possible for both the detection region as a volume and the actuation region as a volume. However, it may also be advantageous to prescribe two or more distance limits, which now make it possible to define a floating detection region or floating actuation region as a respective volume, as it were. This ensures that inadvertently standing within the actuation region will not lead to a possibly undesired triggering of the action as the result of triggering the signal. As a result, gestures can be detected and predefined even more clearly, and differentiated from other gestures that are not intended to trigger the action. The mode of action for a method according to the invention or an assembly module according to the invention will be briefly explained below based on an example.

According to the invention, a distinctly higher security is now achieved for implementing the method or configuring the assembly module. In known solutions, a mistaken opening might still potentially still take place, for example if the user of the vehicle is located behind the vehicle with his or her radio key, even in the absence of any request that the tailgate open. In such a case, it could happen that the user moves into the actuation region by chance, after which an opening request or triggering request for the action is inadvertently detected. Using the laser light flash according to the invention now allows 3D information to place a clearly stronger limitation on the actuation region, in particular on its height. This enables an improved ability to distinguish between various gestures, which now tangibly reduces the risk of the described erroneous triggering.

In another advantage to this assembly module according to the invention, a fine determination of the three-dimensional information by means of the laser light flash is only necessary with respect to the actuation region. As a consequence, an assembly module according to the invention makes it possible to implement a two-stage method, in which the laser light flash is used for the predefined actuation region, in particular not continuously, but only given a detection of the user within the detection region.

In the sense of the present invention, a laser light flash is to be understood as any form of wavelengths, which are encompassed by the term of a laser light. A flash for the laser light is formed when the laser light is not sent out continuously, but rather only for a very short timeframe preferably measuring less than approx. one second. The laser light flash is preferably even sent out multiple times, so that reference can also be made to a pulsed laser light flash. A further explanation will also be provided in this regard later.

It may be advantageous in an assembly module according to the invention that the optical sensor system be designed in such a way, in the event that the user is recognized in the detection region, as to trigger a signal for starting an authentication check between the ID transmitter and an access control system of the motor vehicle, and execute steps b) to c) only given a positive authentication result. According to the invention, this means that the sensor system only executes its critical triggering steps with the help of the laser light flash if the authorized user is also actually located within the detection region. This ensures that the high energy demand for sending out a laser light flash is only implemented when the authorized person is also actually located in the corresponding position in the detection region. In this embodiment, it is of course possible that the authentication step only be performed if the vehicle is locked. In an unlocked vehicle, it is thus possible for the passenger or a person without a radio module inside the pants pocket to also trigger the corresponding action, for example.

In addition, it is advantageous in an assembly module according to the invention that the optical sensor system be designed to suppress steps b) to c) if no user has been recognized in the detection region. Alternatively thereto, of course, the steps b) to c) can be actively permitted or executed if a user has been recognized in the detection region. As evident from these two design variants, in particular the energy demand can be distinctly reduced. The necessary fine determination for reducing the erroneous tripping risk according to the invention is thus only performed when a user is actually also located within the detection region. In particular in long-term parking situations, for example when a vehicle stays in a parking garage of an airport for several days or weeks on end, the low energy demand for monitoring the detection region can now be maintained. The high energy demand for generating the laser light flashes, for example, is avoided in this continuous monitoring, and only implemented when the user has actually been recognized within the detection region. In particular, this embodiment is combined with the authentication check according to the preceding paragraph. This prevents the high energy demand for a laser light flash from being implemented for each person that moves through the detection region. Achieved as a result is an even further reduction in the necessary energy demand for continuously operating the assembly module.

According to the invention, it is further advantageous in an assembly module according to the invention that the optical sensor system comprise a transmitting unit for sending out a laser light flash with a wavelength in the infrared range, in particular with a wavelength lying within a range of 905 nm plus/minus approx. 10 nm. The advantage to laser light flashes with a wavelength in the infrared range is that they are not visible to the human eye. This avoids the influence of light, e.g., in a parking garage. This embodiment is also advantageous, since there is no optical perception by the user, so that the sensor systems are invisible, as it were. Not least, using the laser light flash in the infrared range makes it possible to achieve independence from ambient light. The infrared range is likewise advantageous in this case, since it can be distinguished more clearly and above all better from the ambient scattered light or reflections of sunlight. In particular, the region in which the laser light flash is sent out is designed as a wavelength peak limited as narrowly as possible. As a result, the transmitted and reflected laser light flash can be easily and above all computationally filtered out, even given a broad spectrum that is perceived as the overall reflection of the optical sensor device.

Likewise, energy may be economized using light with varying wavelengths. The detection region can be monitored until any object in the detection region has been recognized one time using light with a longer wavelength than for the subsequent process of checking additional requirements placed on the detection of a user. For example light with a wavelength of 905 nm can be initially used. If an object is determined in the detection region, light with a wavelength of 800 nm can be used, for example. Alternatively, the wavelength can be shortened when the object moves from the remote zone into the proximate zone.

Another advantage may be realized in an assembly module according to the invention if the optical sensor system comprises at least one optical filter, in particular an infrared filter, for optically filtering a transmitted laser light flash and/or a reflection of the laser light flash. It is preferred if this optical filter be provided exclusively for the transmitting unit or exclusively for the receiving unit. As a result, the reduction in width of the transmitted peak in the wavelength spectrum of the laser light pulse already described in the preceding paragraph can be reduced. This makes it possible to subsequently filter out the transmitted laser light flash from a broad reflection spectrum in a specific and simplified manner, and in particular computationally. Of course, a corresponding filter can also be used in an accompanying receiving unit. Because such an optical filter can be used to reduce the width of the spectrum of the transmitted laser light flash in terms of its wavelength, simpler and above all less expensive light sources can be used for the laser light flash.

It is also advantageous in an assembly module according to the invention that the optical sensor system comprise at least one polarizer for polarizing a transmitted laser light flash and/or the reflection of the laser light flash. This polarizer can perform a function similar to that of the corresponding optical filter according to the preceding paragraph. It here also becomes possible to more closely specify the transmitted laser light of the laser light flash, so as to subsequently perform an easier, faster and above all preferably purely computational analysis on the reflected laser light of the laser light flash in a broad received reflection spectrum. The polarizer can here be arranged on the transmitting unit, on the receiving unit or on both of these units.

It is further advantageous in an assembly module according to the invention that the optical sensor system comprise an optical system for expanding the Gaussian distribution of intensity of a transmitted laser light flash, so as to provide a sufficiently high intensity to the edges of the detection region. This must be construed to mean that a diversification of the transmitted laser light flash is preferably homogenized. Since sending out a laser light flash involves a transmission toward the detection region, outer limits can be defined for this monitoring step or this conformity step. These outer limits preferably coincide with the outer limits of the predefined actuation region, which has already been explained and is smaller than the detection region in design. These outer limits now serve to permit a delineation between a desired actuation and undesired actuation. Homogenizing the Gaussian distribution toward these edges or these limits ensures that the acquisition of three-dimensional information via the laser light flash will be sharply delineated even on the edges or limits of the actuation region. A distinction must here be made that this expansion of the laser light beam is purely geometric in nature with respect to the homogenization effect. The width of the frequency peak is here explicitly not expanded.

Another advantage may be achieved in an assembly module according to the invention if the optical sensor system comprises a cylindrical or essentially cylindrical structural shape. This yields a particularly compact construction, which in particular can be especially simply and easily arranged in or on the vehicle. The cylindrical axis is preferably correlated to this structural shape, e.g., aligned along the transmitting direction of the laser light flash or in other transmitting directions. As a result, during the installation of the assembly module, and hence also of the optical transmitting unit, the assembly module can be easily and unambiguously aligned in the manner desired and also so as to be advantageous for the inventive effect.

It is also advantageous in an assembly module according to the invention that the optical sensor be designed to overlap, in particular to completely overlap, the detection region and/or actuation region with a transmitted laser light flash. This must be construed to mean that the entire detection region, or preferably only the entire actuation region, is also overlapped by the laser light flash. This ensures that the quality according to the invention of the additional distance information is present as 3D information for the entire detection region or the entire actuation region. Let it here be noted once again that a corresponding transmitting unit of a sensor system preferably provides an opening cone for sending out the laser light flash. As a volume extension, this light cone correspondingly also overlaps an accompanying volume extension of an actuation volume or the actuation region and a detection volume or the detection region.

It is further advantageous in an assembly module according to the invention that the optical sensor system comprise a control device with a transmitting unit for sending out a laser light flash, wherein the transmitting unit comprises an alignment with a transmitting direction acutely angled relative to the horizontal, in particular at an angle greater than approx. 30°. In particular, this angle is downwardly directed. Since laser light flashes are usually used for such embodiments at a higher intensity, the downward alignment brings with it an increase in safety. In particular, this also enables the use of energies with a magnitude that defines a laser class that would have a damaging effect on the eye of a user exposed thereto. Downwardly aligning the transmitting direction makes it possible to clearly reduce the danger of any entry into the human eye during the use of such an optical system. At the same time, an alignment takes place relative to an actuation region, which preferably is situated on the floor or in the area of the floor, or just above the floor. When monitoring a side door, optical monitoring can correspondingly take place in the area of the door handle.

It is further advantageous in an assembly module according to the invention that the optical sensor system comprise a control device for evaluating the time difference between the transmission of a laser light flash and the detection of the reflection of the laser light flash from the user based on the distance of the user from the optical sensor system. In particular, the already indicated TOF determination is here used. This case involves determining the point in time at which the laser light flash is sent out. Determined after that is the point in time at which the reflection of the laser light flash from the user is perceived by a corresponding receiving unit of the optical sensor system. Finally, the time difference between these two points in time can be determined. The time difference is used to determine the actual distance from the user via correlation with the speed of light. As a result, three-dimensional information can be obtained about the geometric positioning of the user within the detection region or within the actuation region. In particular, even precise coordinates can thus be acquired with respect to these three dimensions for the user or body part of the user.

It is further advantageous in an assembly module according to the invention that the signal be triggered for executing at least one of the following actions on the motor vehicle:

Opening and/or closing the tailgate of the vehicle
Opening and/or closing a sliding door of the motor vehicle
Opening and/or closing a side door of the motor vehicle
Opening and/or closing a window of the motor vehicle
Opening and/or closing the hood of the motor vehicle
Opening and/or closing the gas cap of the motor vehicle
Switching on and/or off an auxiliary heater of the motor vehicle
Switching on and/or off a window heater of the motor vehicle
Switching on and/or off a light function of the motor vehicle
Folding in and/or out the side mirrors of the motor vehicle
Switching on and/or off an alarm system of the motor vehicle
Setting a user-specific position in the motor vehicle, in particular adjusting the driver's seat Deploying and/or retracting a trailer coupling.

The above list is not a conclusive one. The respective object, i.e., the tailgate, sliding door, side door, window, hood or corresponding sunroof, can preferably be opened and/or closed automatically. For example, the user of the vehicle can now actively open or close the tailgate with a corresponding gesture. The assembly module equipped in this way can also be used according to the invention for the automatic, and hence motor-driven, opening and closing of a sliding door or side door of the vehicle. The same holds true for a motorized movement of the window, sunroof, hood or gas cap. Of course, other functions of the vehicle can also be considered for an action. For example, this can be a controller or regulator for turning an auxiliary heater on and off. A corresponding window heater can also already be turned on from outside of the vehicle in winter. A light function, which improves the lighting in an area where the user happens to be at the time, can also be turned on or off with an assembly module according to the invention. Before or after a parking operation, the side mirrors of the vehicle can be automatically folded in and out by an assembly module according to the invention. The alarm system of a motor vehicle can also be operated with the help of an assembly module according to the invention. Not least, user-specific settings, e.g., the sitting position on the driver's seat, can be set in advance by an assembly module according to the invention.

It may be further advantageous in an assembly module according to the invention that the optical sensor system comprise a control device with a detection unit for executing step a), a transmitting unit for executing step b), and an evaluation unit for executing step c). As a consequence, all procedural steps performed by an optical sensor system according to the invention can be executed by corresponding units of the control device. Of course, individual units can also be combined with each other. For example, the receiving unit and detection unit can together be designed as a single and shared sensor unit. A transmitting unit can also be doubled up for various different types of light.

An assembly module according to the above paragraph can be further developed in such a way that the transmitting unit comprises at least one laser light source for the transmission of a laser light flash, in particular for the pulsed transmission of a plurality of laser light flashes in succession, and the control device further comprises a receiving unit for detecting a reflection of the laser light flash. This yields a further improvement of the assembly module according to the invention, since it is now possible to acquire not just a single positioning, but also detailed information regarding the three-dimensional movement of the user relative to the actuation region. The laser light flashes can here be sent out by laser light diodes, for example. Each corresponding laser light source can here comprise one or more laser light diodes. Pulsed transmission preferably takes place at a frequency of 20 or more laser light flashes per second.

It may further be advantageous for the at least one laser light source to be located next to the receiving unit. In particular given several laser light sources, the latter are all uniformly distributed uniformly or around the receiving unit. A more evened out lighting can be achieved as a result. A great proximity is preferably established between the transmitting unit and receiving unit, so that the angle between the transmitting direction and receiving direction of the transmitting unit and receiving unit becomes negligible during the already described TOF measurement.

It may further be advantageous in an assembly module according to the invention that the transmitting unit be designed to send out a laser light flash along at least two transmitting directions, which meet at a focal point arranged within the detection region, in particular within the actuation region. These laser light flashes can correspondingly each be sent out individually with a diminished energy, so that the necessary energy for the desired reflection work is only achieved in the focal point within the detection region. This focal point can be point-like or provided as a volume element, which is formed within the detection region. Such a volume element of the focal point is preferably smaller than or equal to the actuation region in the form of an actuation volume.

It is also advantageous in an assembly module according to the invention that a laser light flash be sent out in the actuation region, which is smaller in design than the detection region within the detection region. As a result, the actuation region is correlated with the laser light flash, so that three-dimensional fine monitoring with the laser light flash need no longer even take place in unnecessary areas of the detection region. In particular, this reduces the necessary energy demand, which the laser light flash now uses to a limited extent for the exclusively required actuation region.

The present invention also relates to a method for triggering a signal for executing an action on a motor vehicle, comprising the following steps:
a) Monitoring a detection region lying outside of the motor vehicle, so as to determine the proximity of a user,
b) In the event the user is recognized in the detection region, monitoring a actuation region situated within the detection region to determine whether the user is located within the actuation region, and
c) In the event the user is recognized in the actuation region, triggering a signal for executing an action on the motor vehicle.

A method according to the invention is designed in particular for operations in an assembly module according to the invention. Accordingly, a method according to the invention brings with it the same advantages described at length with respect to an assembly module according to the invention.

Additional advantages, features and details of the invention may be gleaned from the following description, in which exemplary embodiments of the invention are described in detail, making reference to the drawings. The features mentioned in the claims and specification can here be essential to the invention, whether taken individually or in any combination desired. Shown schematically on:

Figure 1:
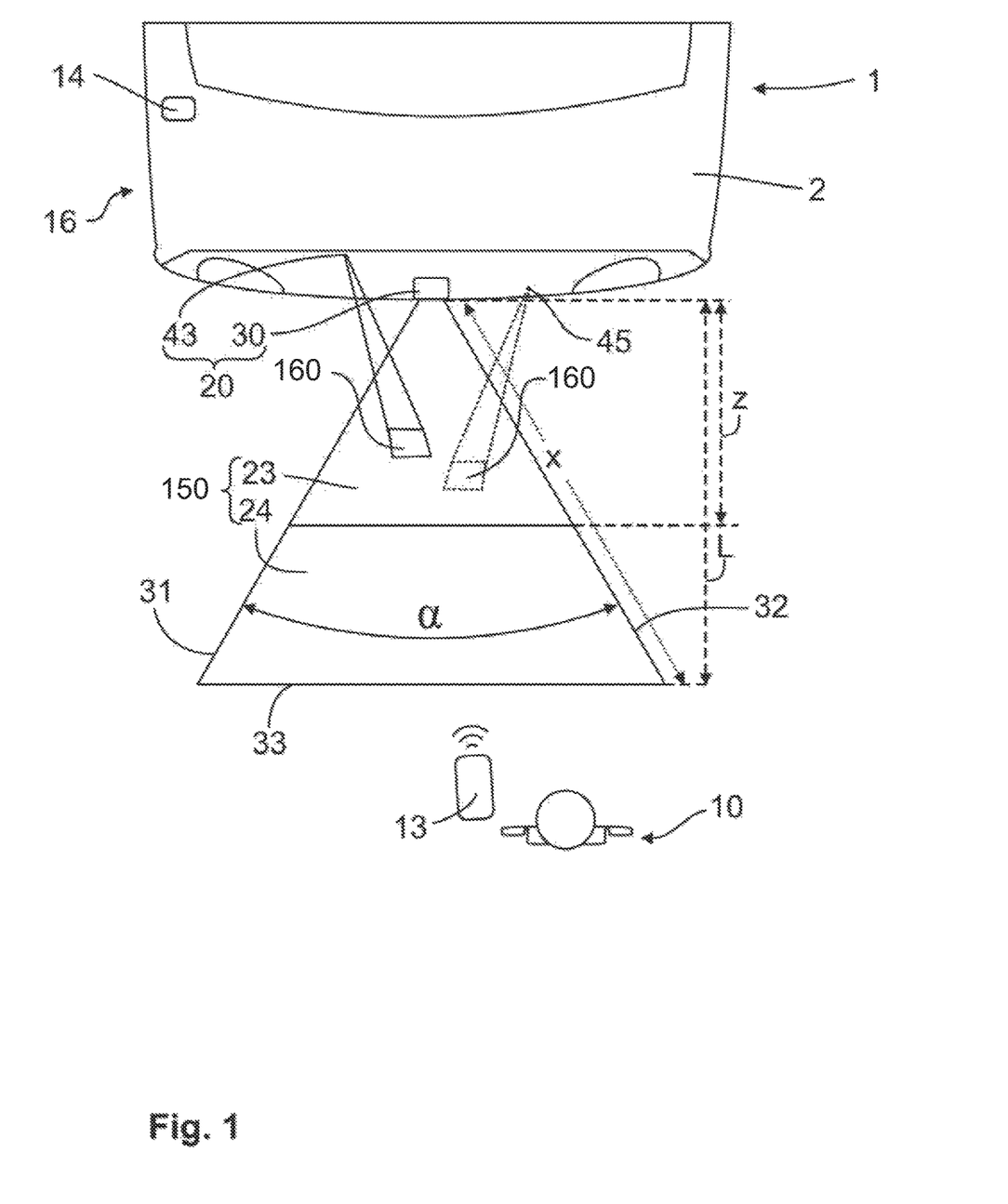
FIG. 1 is a top view of a rear area of a motor vehicle with an assembly module according to the invention and an authentication system according to the invention.
Figure 2:
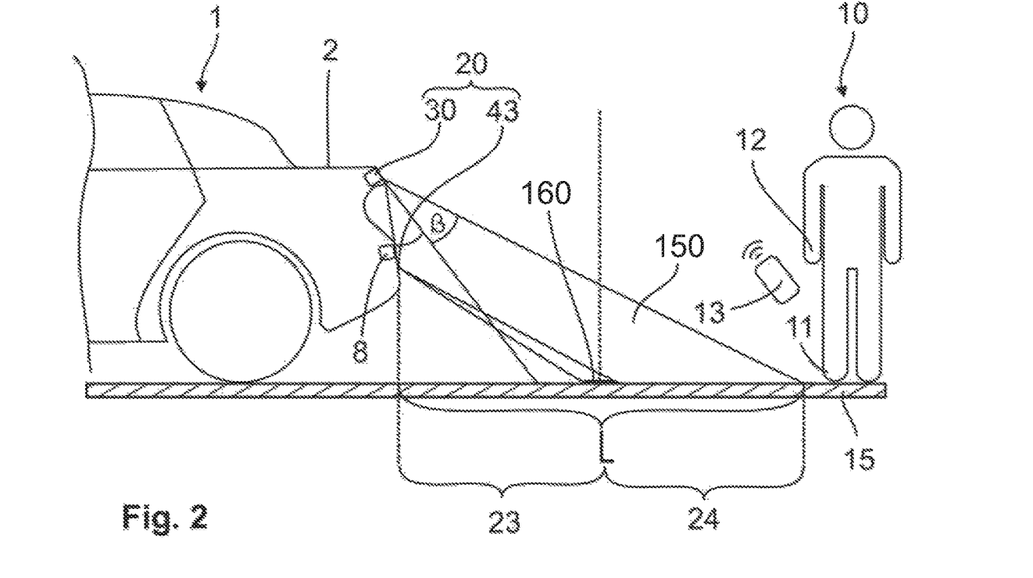
FIG. 2 is a side view of the rear area from FIG. 1.
Figure 3:
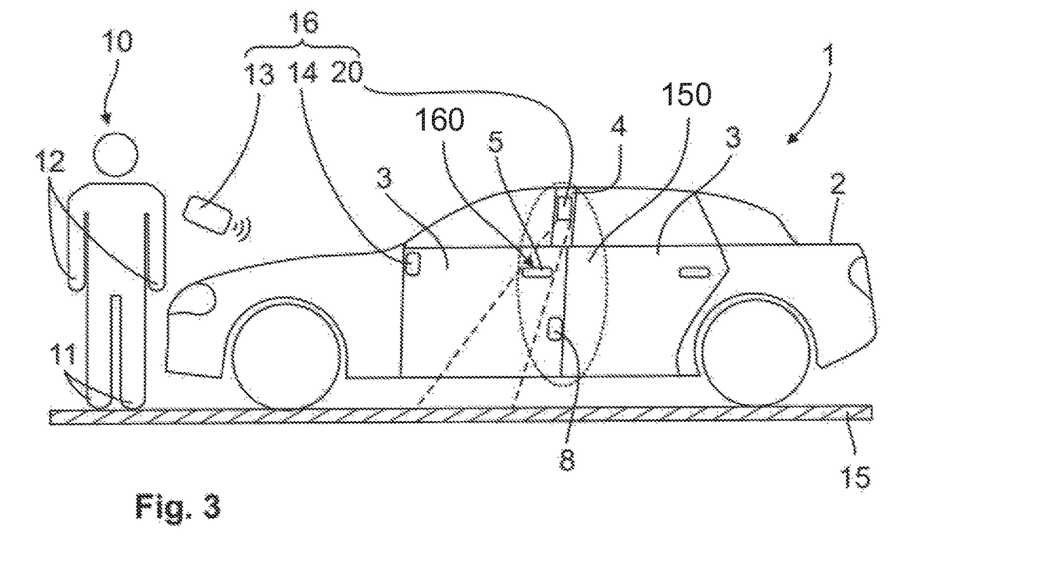
FIG. 3 is a side view of a side area of a motor vehicle with an assembly module according to the invention and an authentication system according to the invention.
Figure 4:
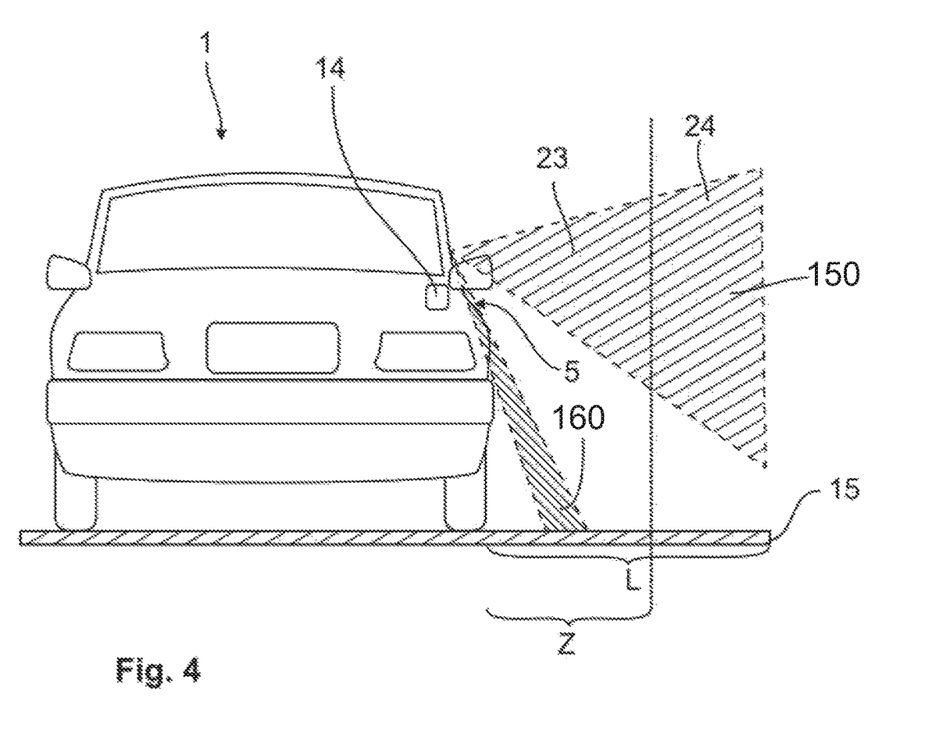
FIG. 4 is another side view of the assembly module from FIG. 3.

FIGS. 1 and 2 on the one hand and FIGS. 3 and 4 on the other each show how an assembly module 20 according to the invention and an authentication system 16 according to the invention are used in a motor vehicle 1. FIGS. 1 and 2 here depict usage in a rear area of a motor vehicle 1 with a tailgate 2. The optical sensor system 30 of the assembly module 20 is arranged in the area of the tailgate 2, e.g., in a handle strip of the tailgate 2. The optical sensor system 30 generates a detection region 150 lying outside of the motor vehicle 1. With the motor vehicle 1 parked, the optical sensory system 30 continuously monitors the detection region 150. If a user 10 still depicted outside of the detection region 150 on FIGS. 1 and 2 approaches the motor vehicle 1 and optical sensor system 30 with an ID transmitter 13, the user 10 enters into the detection region 150. If the user 10 is recognized in the detection region 150, a signal is preferably triggered to start an authentication check.

Because the optical sensor system 30 recognizes that a user 10 is approaching the motor vehicle 1, and because a signal to start the authentication check is triggered given a recognition of the user 10 in the detection region 150, the user need not become active to initiate the authentication check. As a consequence, the user 10 need not hold the ID transmitter 13 in one hand, with it rather sufficing to keep the ID transmitter 13 in a pocket on his or her person, for example. Therefore, this case involves a passive-keyless-entry check.

Because an optical sensor system 30 monitors the detection region 150, it can be ensured on the one hand that the signal for starting the authentication check is triggered before the user 10 reaches the motor vehicle 1. In this case, the authentication check is usually completed before the user 10 has approached closer to the motor vehicle than an actuation region 160. On the other hand, the detection region 150 is confined to a prescribed space section, for example that only encompasses a few m² viewed from the top, so that the signal for starting the authentication check is only rarely triggered. As a result, the signal for starting the authentication check can be triggered in timely and targeted manner.

In a top view, the detection region 150 comprises two legs 31, 32, which approach each other toward the optical sensor system 30. The detection region 150 likewise comprises a base 33, which borders the detection region 21 on the side of the detection region 21 facing away from the optical sensor system 30. The detection region 21 ends at the base 33. The base 33 is straight in design. The two legs 31, 32 form an angle α. The fact that the detection region 150 tapers in the direction of the motor vehicle 1 makes it possible to achieve the timely and yet rare triggering of the signal for starting an authentication especially well.

The angle α on FIG. 1 measures between 30° and 60°. This prevents a user 10 walking by the side of the motor vehicle 1 from getting into the detection region 150. A length L resulting from the distance between the base 33 and optical sensor system 30 measures 1.5 m. The length L and angle α also yield x as the maximum distance of a point in the detection region 150 from the optical sensor system 30. The selected parameters limit the detection range 150, so that only a little electrical power is required for monitoring the detection region 150. As shown on FIG. 2, the detection region 150 ends on a floor surface 15 on which the motor vehicle 1 is parked. As a result, the detection region 150 comprises an inclined truncated cone. An angle β depicted on FIG. 2 corresponds to an angle of the detection region 21 in a side view. The selected angle α is here not equal to angle β, so that the detection region 150 has an elliptical design.

Another way of using only a little electrical power is provided by dividing the detection region 150 into a remote zone 24 and a proximate zone 23, wherein the proximate zone 23 is spaced a smaller distance apart from the sensor system 30 than the remote zone 24. If the user 10 initially enters the remote zone 24, the optical sensor system 30 determines that an object is located in the remote zone 24. The optical sensor system 30 further checks whether the object has a prescribed size. If the object comprises the prescribed size, and if the object is located in the proximate zone 23 of the detection region 150, the distance between the object and an optical sensor 50 is also measured in the proximate zone 23 to ascertain whether the object is approaching the optical sensor. If the answer is affirmative, the user 10 is recognized, and a signal is triggered for starting an authentication check between the ID transmitter 13 and an access control system 14 of the motor vehicle 1.

The signal prompts the access control system 14 to send a wakeup signal to the ID transmitter 13. The ID transmitter 13 then relays an authentication code to the access control system 14. The access control system 14 compares the authentication code with a stored code. If the two codes match, authentication is successful, and an unlocking signal is triggered. This case can involve an unlocking signal for all doors of the motor vehicle 1, or just one unlocking signal for the tailgate 2.

FIGS. 1 and 2 further depict the first actuation region 160. After a successful authentication, the optical sensor system 30 monitors the first actuation region 160. If the user 10 now performs a predefined motion in the first actuation region 160, for example stepping into the first actuation region 160 with one foot 11 for a certain period of time and within a predefined actuation duration, an operating signal is triggered. The operating signal is a signal for opening the tailgate 2. It may here only be that a door lock 8 of the tailgate 2 is unlocked, and springs open easily upon exposure to the pressure of a gasket. On the other hand, it is conceivable for a motorized opening aid to simultaneously be activated by the operating system, so that the tailgate 2 opens completely.

The actuation region 160 is preferably visible on the floor surface 15. In this embodiment, a first display element 43 is provided for this purpose, which makes the actuation region 160 visible to the user 10. For this purpose, the first display element 43 can emit visible light. The first display element 43 is activated after a successful authentication. The first actuation region 160 lies within the proximate zone 23 of the detection region 150 on FIGS. 1 and 2. The actuation region 160 has smaller spatial dimensions than the detection region 150.

It can be that the first actuation region 160 is the only actuation region. A second actuation region 160 is depicted as an option, and hence with dashed lines on FIG. 1. In this case, a user 10 must perform a predefined motion in both actuation regions 160 within a predefined actuation duration to provide the operating signal. A second display element 45 of the assembly module 20 serves to visualize the second actuation region 160.

FIGS. 3 and 4 present another exemplary embodiment for how the assembly module 20 according to the invention is used. Unless otherwise explained below, the mode of action and function of the assembly module 20 depicted on FIGS. 3 and 4 correspond to the mode of action and function of the assembly module 20 depicted on FIGS. 1 and 2. The assembly module 20 on FIGS. 3 and 4 is arranged in a B-pillar 4 of a vehicle side. An approach toward a side door 3 of the motor vehicle 1 is monitored via the detection region 150. The operating signal can serve to open the side door 3. The predefined motion for providing the operating signal can be a predefined motion by a hand 12 of the user 10 in the area of a door handle 5.

As opposed to the exemplary embodiment on FIGS. 1 and 2, the detection region 150 lying outside of the motor vehicle 1 is located completely over the floor surface 15 in the exemplary embodiment shown on FIGS. 3 and 4. The detection region 150 comprises a flat base surface. The actuation region 160 in the exemplary embodiment on FIGS. 3 and 4 encompasses the area of the door handle 5. The sole actuation region 160 lies outside of the detection region 150.

Figure 5:
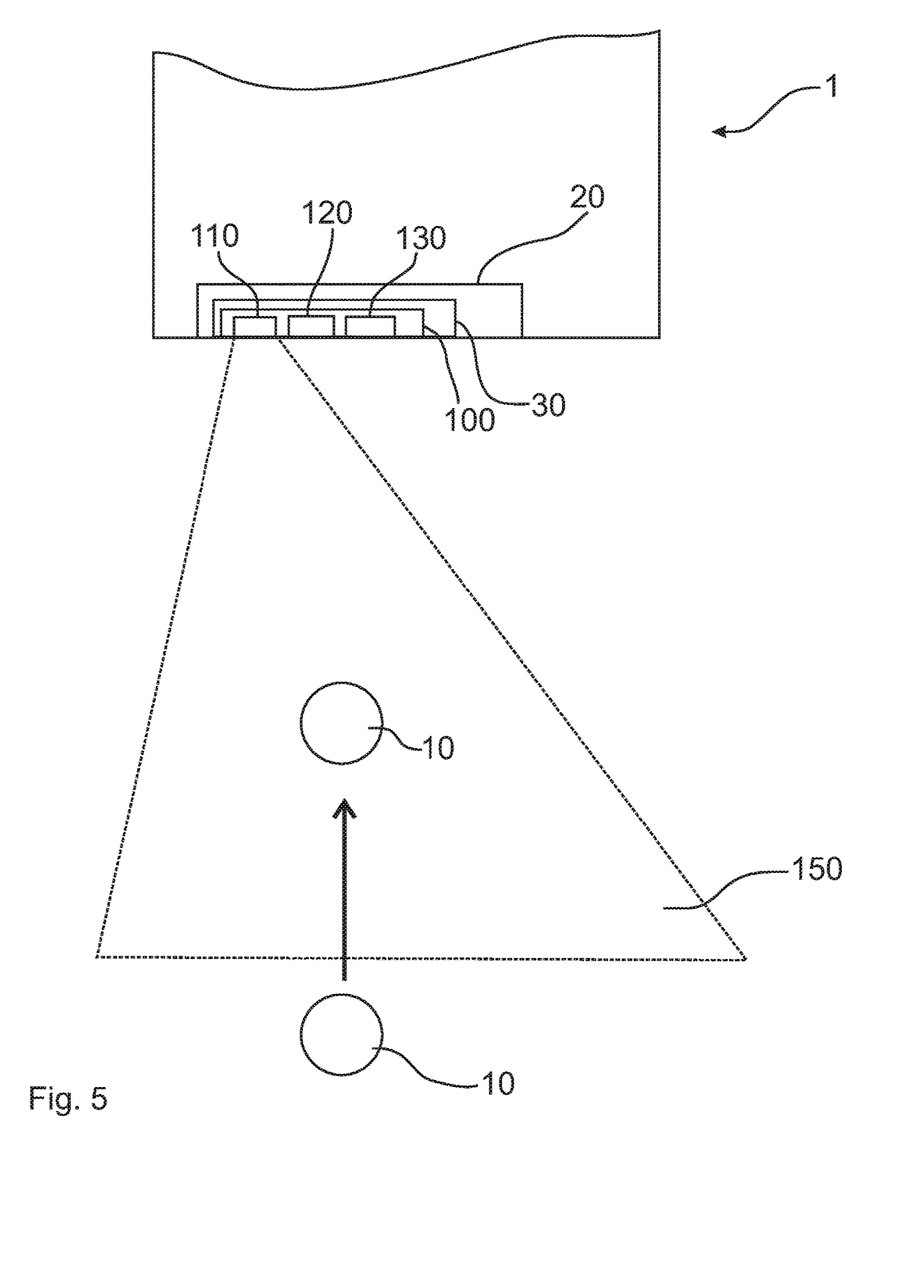
FIG. 5 is an embodiment of an assembly module according to the invention.

FIG. 5 shows an embodiment of an assembly module 20 according to the invention, which is arranged in a motor vehicle 1 on the rear side. This assembly module 20 is equipped with a control device 100, which is part of an optical sensor system 30. The control device 100 in this embodiment comprises a detection unit 110, a transmitting unit 120 and a receiving unit 130.

The detection unit 110 is able to monitor the detection region 150 situated toward the rear, behind the motor vehicle 1. To this end, for example, the detection unit 110 can comprise a photo sensor. Additional transmitting units 120 for monitoring the detection region with artificial light are also possible, so as to achieve a corresponding independence from the ambient light. Pulsed light flashes can also be used here already.

According to the invention, a transmitting unit 120 for sending out a laser light flash 122 is now also provided. The procedural steps to be executed, which are made possible by an assembly module 20 according to the invention, will now be described in more detail based on FIGS. 5 and 6.

FIG. 5 illustrates how a user 10 enters into the detection region 150, e.g., with a body part or completely. Since the detection region 150 is monitored essentially continuously by the detection unit 110, the optical sensor system 30 recognizes this movement by the user 10 with the help of the control device 100. In preferably a two-stage process, the laser light flash 122 can now be sent out, so as to obtain additional positional information for the user 10. It here now becomes possible to correlate the position of the user 10 with an actuation region 160. The laser light flash 120 is here preferably sent out in a transmitting direction 124 that overlaps with the actuation region 160 or precisely illuminates the latter with a homogeneous intensity distribution.

Figure 6:
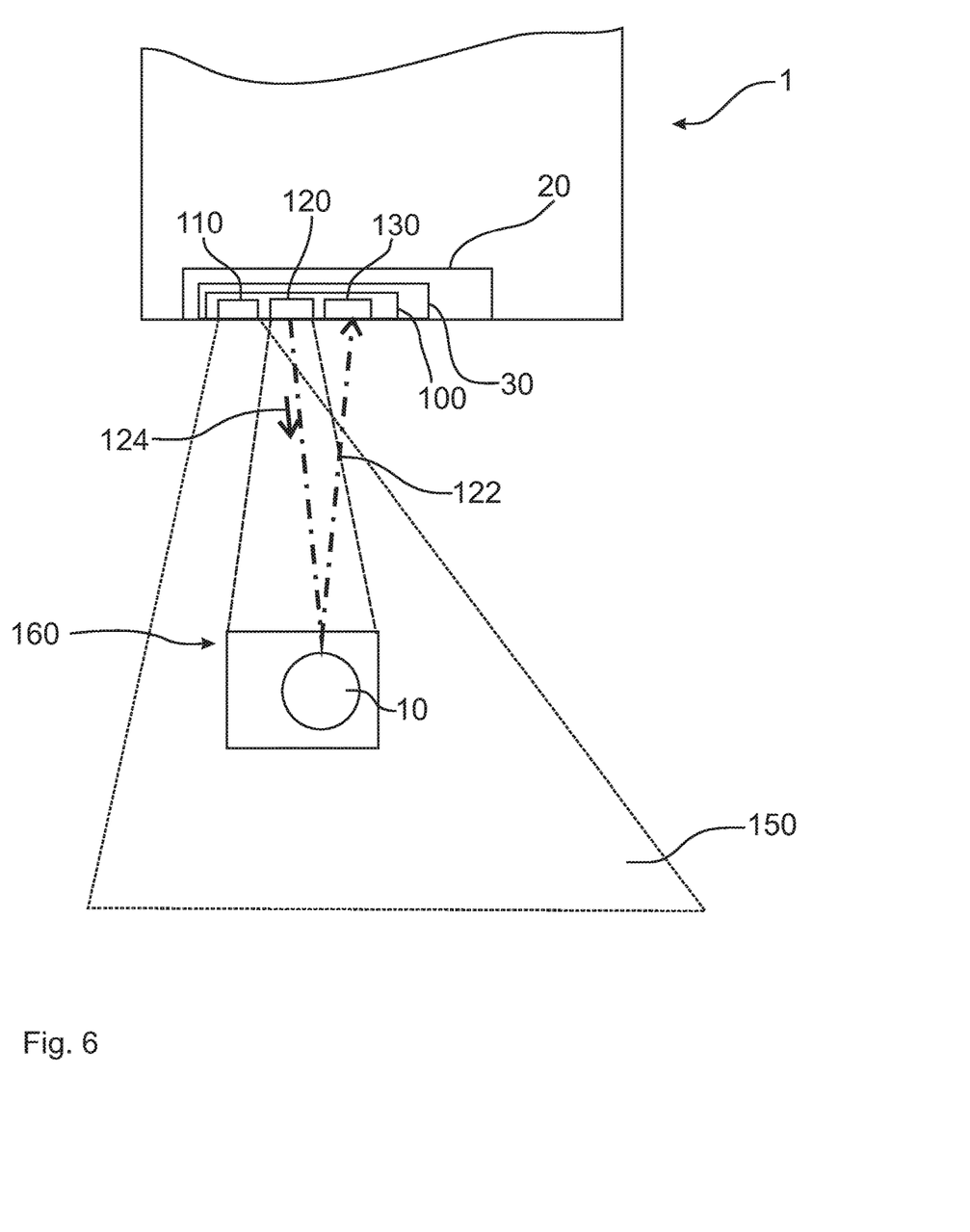
FIG. 6 is the embodiment on FIG. 5 with a user within the actuation region.

As may be gleaned from FIG. 6, the laser light flash 122 is at least partially reflected by the user 10. This reflected light of the laser light flash 122 can now be received and evaluated by a receiving unit 130. An evaluation takes place in particular based on the so-called TOF measurement, thereby now providing additional distance information to more precisely position the user 10 correlated with the actuation region 160.

Because the user 10 has now been recognized within the actuation region 160 on FIG. 6, a signal can be triggered for executing an action on the motor vehicle 1. For example, this can involve opening the tailgate or side sliding door of the motor vehicle 1.

Figure 7:
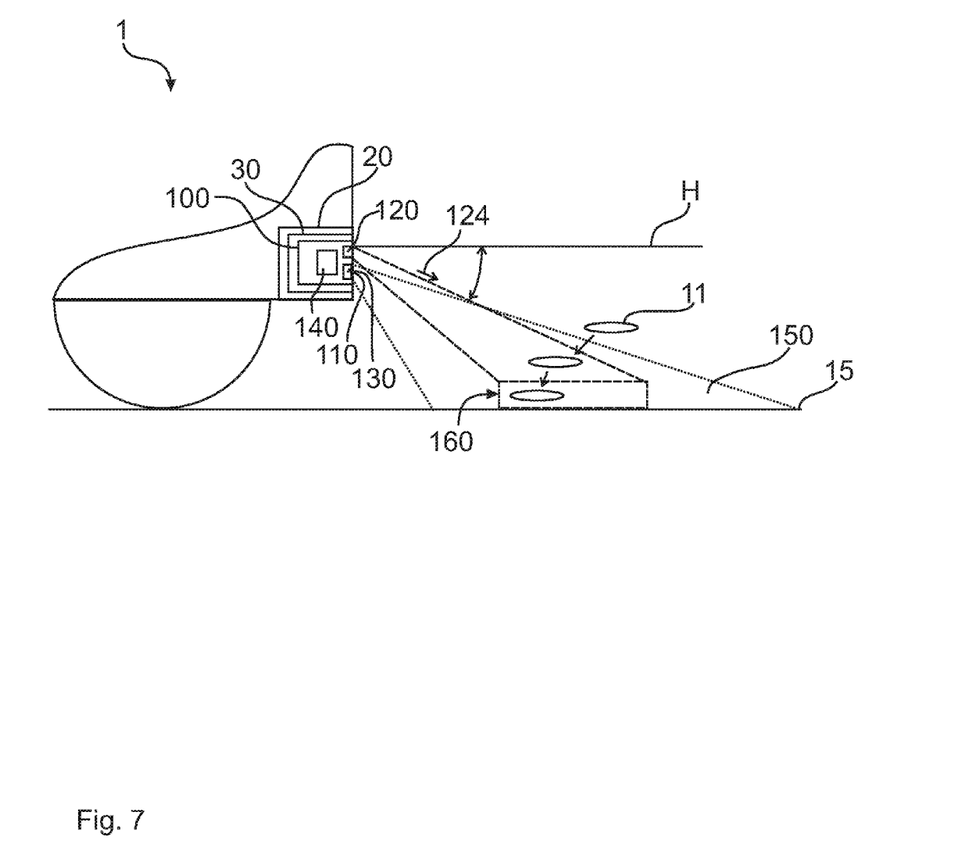
FIG. 7 is another embodiment of an assembly module according to the invention.

FIG. 7 presents a schematic side view of another embodiment of an assembly module 20 according to the invention. The latter is equipped with an optical system 30, which again comprises a control device 100. As readily visible here, the transmitting unit 120 is situated above the detection unit 110, wherein the detection unit 110 also comprises the receiving unit 130 in a combined function. In order to execute the individual procedural steps, in particular the evaluation, the control device 100 in this embodiment additionally comprises an evaluation unit 140.

As readily discernible from FIG. 7, using a laser light flash 122 to determine the fine position now makes it possible to monitor volume information regarding the detection region 150 or actuation region 160. Shown here is the movement by a foot 11 of a user 10. If the foot 11 of the user 10 is moved along the three illustrated positions, it first enters into the volume of the detection region 150. Only at this point in time is are the pulsed laser light flashes 122 sent out along the transmitting direction 124 in preferably the two-stage process, until such time as the foot 11 of the user 10 is now recognized as being in the volume of the actuation region 160. The signal for executing an action on the motor vehicle can now be triggered.

As further discernible, an angle is formed between the horizontal H and transmitting direction 124 of the laser light flash 122 on FIG. 7 that points acutely downward. This enables monitoring from the top down, thereby precluding a risk of injury to the human eye, preferably even entirely.

Figure 8:
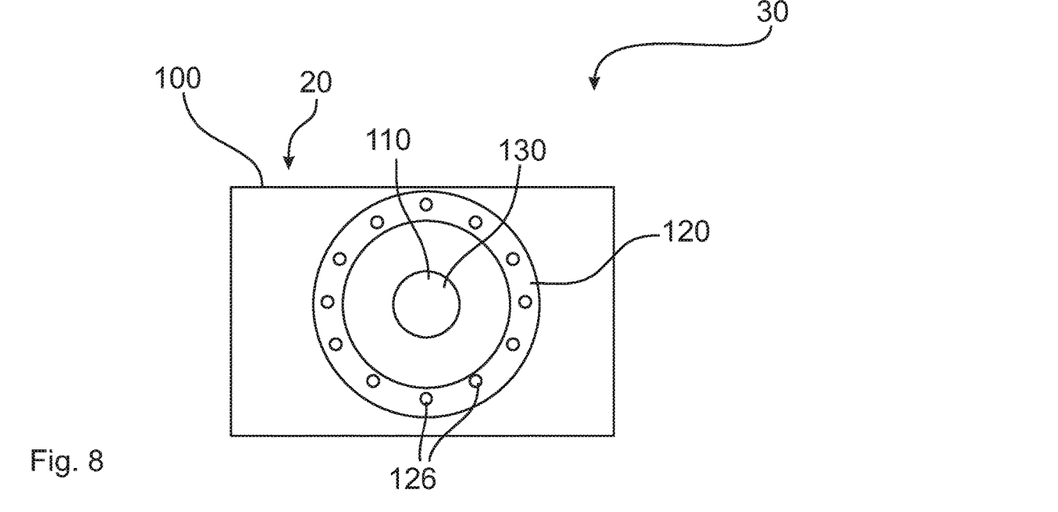
FIG. 8 is another embodiment of an assembly module according to the invention.

Shown on FIG. 8 is an embodiment of an assembly module 20 according to the invention, in which the transmitting unit 120 comprises a plurality of laser light sources 126. These individual laser light sources 126 are here circularly and uniformly distributed around the receiving unit 130, which here also comprises the detection unit 110. This results in an especially uniform distribution of light relative to the transmission of the laser light flash 122. At the same time, reducing the distance between the transmitting unit 120 and receiving unit 130 makes it possible to disregard the angle for subsequent evaluation with the TOF method.

Figure 9:
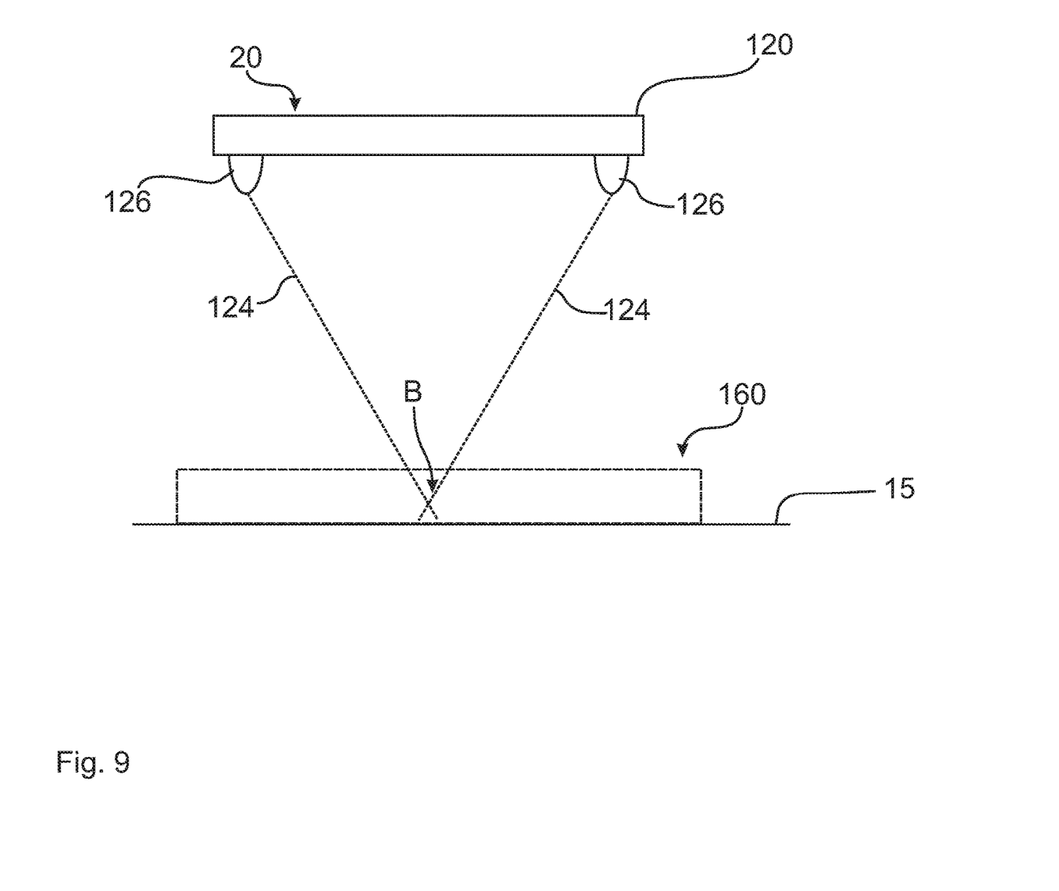
FIG. 9 is another embodiment of an assembly module according to the invention, Elements with the same function and mode of action are marked with the same reference numbers on the figures.

FIG. 9 depicts another embodiment of an assembly module 20 according to the invention. Several laser light sources 126 are here spaced apart from each other for the transmitting unit 120. This yields several, here a schematically illustrated two, transmitting directions 124, which comprise a focal point B within the actuation region 160. As a result, the individual laser light sources 126 can be operated at a reduced energy, since the corresponding energy density for the desired reflection from the user 10 is only made available in focal point B. Apart from the energy demand, this also reduces the danger of damage, e.g., to the human eye, since the high energy density is only reached in focal point B. Let it here be noted that focal point B can also take the form of a volume element within the actuation region 160.

The above explanation of embodiments describes the invention exclusively within the framework of examples. Of course, individual features of the embodiments can be combined with each other to the extent technically feasible, without departing from the framework of the present invention.

REFERENCE LIST

1 Motor vehicle
2 Tailgate
3 Side door
4 B-pillar
5 Door handle
8 Door lock
10 User
11 Foot
12 Hand
13 ID transmitter
14 Access control system 15 Floor surface
16 Authentication system
20 Assembly module
23 Proximate zone
24 Remote zone
30 Optical sensor system
31 Leg of detection region
32 Leg of detection region
33 Base
43 First display element
45 Second display element
100 Control device
110 Detection unit
120 Transmitting unit
122 Laser light flash
124 Transmitting direction
126 Laser light source
130 Receiving unit
140 Evaluation unit
150 Detection region
160 Actuation region
α Angle between the two legs of the detection region
β Angle
H Horizontal
B Focal point
L Length
x Maximum distance of a point of the detection region

The invention claimed is:

1. An assembly module for a motor vehicle, with an optical sensor system that is suitable for
   a) monitoring a detection region lying outside of the vehicle, so as to determine the proximity of a user,
   b) in the event the user is detected in a detection region, monitoring an actuation region arranged within the detection region to determine whether the user is located within the actuation region, and
   c) in the event the user is detected in the actuation region, triggering a signal for executing an action on the motor vehicle, and
   wherein the optical sensor system is configured to expend less energy for monitoring the detection region than for monitoring the actuation region.

2. The assembly module according to claim 1, wherein the optical sensor system is designed to monitor the actuation region within the detection region by sending out a laser light flash and recognizing a reflection of the laser light flash from the user.

3. The assembly module according to claim 1, wherein the optical sensor system is designed, in the event the user is recognized in the detection region, to trigger a signal for starting an authentication check between an ID transmitter and an access control system of the motor vehicle, and that steps b) to c) are executed only given a positive authentication result.

4. The assembly module according to claim 1, wherein the optical sensor system is designed to suppress steps b) to c) when no user has been recognized in the detection region.

5. The assembly module according to claim 1, wherein the optical sensor system comprises a transmitting unit for sending out a laser light flash with a wavelength in the infrared range, in particular with a wavelength lying within a range of 905 nm plus/minus approx. 10 nm.

6. The assembly module according to claim 1, wherein the optical sensor system comprises at least one optical filter, in particular an infrared filter, for optically filtering at least a transmitted laser light flash or the reflection of the laser light flash.

7. The assembly module according to claim 1, wherein the optical sensor system comprises at least one polarizer for at least polarizing a transmitted laser light flash or the reflection of the laser light flash.

8. The assembly module according to claim 1, wherein the optical sensor system comprises an optical system for expanding the Gaussian distribution of intensity of a transmitted laser light flash, so as to provide a sufficiently high intensity to the edges of the detection region.

9. The assembly module according to claim 1 wherein the optical sensor system comprises a cylindrical or essentially cylindrical structural shape.

10. The assembly module according to claim 1, wherein the optical sensor system is designed to overlap, in particular to completely overlap, at least the detection region or an actuation region with a transmitted laser light flash.

11. The assembly module according to claim 1, wherein the optical sensor system comprises a control device with a transmitting unit for sending out a laser light flash, wherein the transmitting unit comprises an alignment with a transmitting direction acutely angled relative to the horizontal, in particular at an angle greater than approx. 30°.

12. The assembly module according to claim 1, wherein the optical sensor system comprises a control device for evaluating the time difference between the transmission of a laser light flash and the detection of the reflection of the laser light flash from the user based on the distance of the user from the optical sensor system.

13. The assembly module according to claim 1, wherein the signal is triggered for executing at least one of the following actions on the motor vehicle:
    at least Opening or closing the tailgate of the vehicle
    at least Opening or closing a sliding door of the motor vehicle
    at least Opening or closing a side door of the motor vehicle
    at least Opening or closing a window of the motor vehicle
    at least Opening or closing the hood of the motor vehicle
    at least Opening or closing the gas cap of the motor vehicle
    at least Switching on or off an auxiliary heater of the motor vehicle
    at least Switching on or off a window heater of the motor vehicle
    at least Switching on or off a light function of the motor vehicle
    at least Folding in or out the side mirrors of the motor vehicle
    at least Switching on or off an alarm system of the motor vehicle
    Setting a user-specific position in the motor vehicle, in particular adjusting the driver's seat
    at least Deploying or retracting a trailer coupling.

14. The assembly module according to claim 1, wherein the optical sensor system comprises a control device with a detection unit for executing step a), a transmitting unit for executing step b), and an evaluation unit for executing step c).

15. The assembly module according to claim 14, wherein the transmitting unit comprises at least one laser light source for the transmission of a laser light flash, in particular for the pulsed transmission of a plurality of laser light flashes in succession, and the control device further comprises a receiving unit for detecting a reflection of the laser light flash.

16. The assembly module according to claim 15, wherein the at least one laser light source is located next to the receiving unit.

17. The assembly module according to claim 14, wherein the transmitting unit is designed to send out a laser light flash along at least two transmitting directions, which meet at a focal point arranged within the detection region, in particular within the actuation region.

18. The assembly module according to claim 1, wherein a laser light flash is sent out in the actuation region, which is smaller in design than the detection region within the detection region.

19. A method for triggering a signal for executing an action on a motor vehicle, comprising the following steps:
   a) monitoring a detection region lying outside of the vehicle, so as to determine the proximity of a user,
   b) in the event the user is detected in a detection region, monitoring an actuation region arranged within the detection region to determine whether the user is located within the actuation region, and
   c) in the event the user is detected in the actuation region, triggering a signal for executing an action on the motor vehicle, and wherein the method expends less energy for monitoring the detection region than for monitoring the actuation region.

20. The method according to claim 19, wherein the following steps are performed for monitoring the actuation region:
   a) Sending out a laser light flash within the detection region, and
   b) Recognizing a reflection of the laser light flash from the user.

21. The method according to claim 20, wherein
the method according to claim 20 is for operation in an assembly module for a motor vehicle, with an optical sensor system that is suitable for
   a) monitoring a detection region lying outside of the vehicle, so as to determine the proximity of a user,
   b) in the event the user is detected in a detection region, monitoring an actuation region arranged within the detection region to determine whether the user is located within the actuation region, and
   c) in the event the user is detected in the actuation region, triggering a signal for executing an action on the motor vehicle.

22. The assembly module according to claim 15, wherein the transmitting unit comprises a plurality of laser light sources circularly and uniformly distributed around the receiving unit.

* * * * *